H. H. Gridley.
Saw-Set.
N° 83,956.   Patented Nov. 10, 1868.
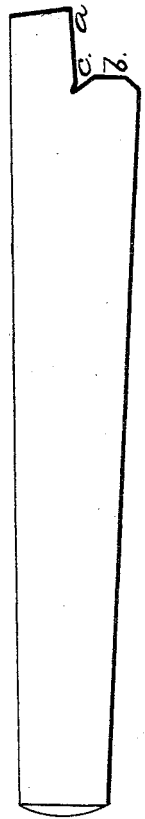
Witnesses:
Edw. C. Marvin.
D. Wight.
Inventor:
Henry H Gridley.

HENRY H. GRIDLEY, OF AUBURN, NEW YORK.

Letters Patent No. 83,956, dated November 10, 1868.

IMPROVEMENT IN SWAGE FOR SAWS.

The Schedule referred to in these Letters Patent and making part of the same.

*To all whom it may concern:*

Be it known that I, HENRY H. GRIDLEY, of the city of Auburn, in the county of Cayuga, and State of New York, have invented a new and useful Improvement in Up-Sets or Swages for Up-Setting the Teeth of Circular Saws.

The nature of my invention consists in constructing an up-set or swage, of such shape as that the cutting-edge of the saw-tooth, when up-set, shall be raised to the extent of about the one thirty-second of an inch, and so that it shall be a very little higher, relatively to the periphery line of the tooth, than it was before it was worn, and so that the point of the tooth, when up-set and filed to a sharp cutting-edge, shall be as high as the periphery-line, without the necessity of filing down that line.

To enable others skilled in the art to make and use my invention, I will proceed to describe its construction and operation.

I make the under side of the upper lip of my up-set at an angle of about five degrees with a horizontal line passing through the centre of the up-set, as shown at *a* in the drawings.

I then make the upper side of the under lip at an angle of about ninety degrees with the under side of the upper lip, as shown at *b* in the drawings.

I then cut a triangular piece out from where the two lips meet, of about one-sixteenth of an inch at the base, and about the same in depth, and passing upwards, so that the point of this triangle shall be about the one twenty-fourth of an inch above where the two lips met before this triangle was cut out, as shown at *c* in the drawings.

The operation of this improved up-set is as follows: When the saw-tooth is placed therein, the cutting-edge thereof presses against the under side of the acute triangle, and when the up-set is struck with the hammer, the end of the saw-tooth is raised upwards and pressed into the acute angle, and thereby the cutting-edge is raised so as to be a little above the periphery-line of that saw-tooth, when, by filing the point of the tooth upon the upper side until it is in line with said periphery, the tooth is brought to a sharp cutting-edge without filing down the periphery-line, and hence the saw is not reduced in diameter by filing upon the upper side of the periphery-line, as is the case when up-sets as heretofore and now made are used, which press the end of the tooth downward.

What I claim as my invention, and desire to secure by Letters Patent, is—

1. The raising of the cutting-edge of the saw-tooth by means of the swage *c*, herein described, and for the purpose set forth.

2. The swage for up-setting saw-teeth, having the triangle *c* formed thereon, as described and for the purpose set forth.

HENRY H. GRIDLEY.

Witnesses:
 EDW. C. MARVINE,
 D. WRIGHT.